United States Patent [19]

Stahlecker

[11] Patent Number: 5,791,786
[45] Date of Patent: Aug. 11, 1998

[54] THRUST BEARING FOR A SHAFT OF AN OPEN-END SPINNING ROTOR

[75] Inventor: Fritz Stahlecker, Josef-Neidhart-Strasse 18, 73337 Bad Überkingen, Germany

[73] Assignees: Fritz Stahlecker, Bad Überkingen; Hans Stahlecker, Süssen, both of Germany

[21] Appl. No.: 684,643

[22] Filed: Jul. 22, 1996

[30] Foreign Application Priority Data

Aug. 4, 1995 [DE] Germany ............... 195 28 623.5

[51] Int. Cl.⁶ .............. F16C 32/06; F16C 23/04; F16C 17/04
[52] U.S. Cl. .............. 384/124; 384/208; 384/425
[58] Field of Search ............... 384/121, 122, 384/124, 425, 206, 208

[56] References Cited

U.S. PATENT DOCUMENTS

| 3,161,445 | 12/1964 | Haller | 384/208 |
|---|---|---|---|
| 3,260,543 | 7/1966 | Henry-Biabaud | 384/208 |
| 3,367,728 | 2/1968 | Labbie | 384/208 |
| 3,589,779 | 6/1971 | Sokol | 384/208 |
| 4,711,590 | 12/1987 | Lakin | 384/206 |
| 4,761,083 | 8/1988 | Smith et al. | 384/208 |
| 4,771,144 | 9/1988 | Goyarts | 384/206 |
| 4,892,417 | 1/1990 | Spargo et al. | 384/124 |
| 5,098,205 | 3/1992 | Zehndbauer et al. | 384/124 |
| 5,405,200 | 4/1995 | Sumiyoshi et al. | 384/208 |
| 5,509,748 | 4/1996 | Idosako et al. | 384/206 |
| 5,515,458 | 5/1996 | Ide | 384/122 |

FOREIGN PATENT DOCUMENTS

| 2212186 | 9/1973 | Germany | 384/206 |
|---|---|---|---|
| 1177633 | 1/1970 | United Kingdom | 384/208 |
| 9003131 | 4/1990 | WIPO | 384/208 |

*Primary Examiner*—Daniel P. Stodola
*Assistant Examiner*—Matthew A. Kaness
*Attorney, Agent, or Firm*—Evenson McKeown Edwards & Lenahan, PLLC

[57] ABSTRACT

An aerostatic bearing is provided for the thrust bearing arrangement of the shaft of an open-end spinning rotor. This aerostatic bearing comprises a bearing plate, which forms a bearing gap with the end of the shaft. An axial thrust, directed against the bearing, is exerted on the shaft. The bearing plate is provided with bore holes for releasing air into the bearing gap. An adjustable ball cup is arranged at the bearing plate for adjusting the bearing gap. This ball cup preferably takes the form of a sliding body which has a spherically shaped surface and is held in a corresponding spherically shaped bearing support. After the open-end spinning rotor has been adjustable cup adjusts automatically so that the surfaces which form the bearing gap are disposed parallel to one another.

23 Claims, 3 Drawing Sheets

THRUST BEARING FOR A SHAFT OF AN OPEN-END SPINNING ROTOR

BACKGROUND AND SUMMARY OF THE INVENTION

The present invention relates to a thrust bearing arrangement for a shaft of an open-end spinning rotor, which shaft is supported by an aerostatic bearing against an axial thrust. The aerostatic bearing comprises a bearing plate which forms a bearing gap with the end of the shaft while the bearing plate is provided with bore holes for releasing air into the bearing gap.

In the case of a thrust bearing of this type (U.S. Pat. No. 5,098,205) the end of the shaft is made of steel, while a carbon material is used for the bearing plate. Because of the intentional wear capability of the material pairing, the end of the shaft can grind onto the bearing plate so that the arising opposing surfaces stand parallel to one another.

Abraded particles occur, however, as a result of the grinding when a spinning aggregate is started up, which can impair the sensitive aerostatic bearing.

It is an object of the present invention to align the end of the shaft and the bearing plate parallel to one another without a "breaking in" of the bearing surfaces arranged to face each other being necessary.

The object has been achieved in accordance with the present invention in that an adjustable ball cup is arranged at the bearing plate for adjusting the bearing gap.

The present invention is based on the prerequisite that the end of the shaft and the bearing plate are each ground level and that it is therefore only necessary to establish the parallelism of the two bearing surfaces for the operation of the aerostatic bearing. This is made possible by the adjustable ball cup, which permits the bearing plate to tilt in all directions. In the case of the necessary bearing plate movements, it is basically only angular seconds that are involved.

Various embodiments of the adjustable ball cup are contemplated, one of which, for example, is a self-aligning ball bearing, by means of which a mounting, which holds the bearing plate, is supported.

In the case of another embodiment, the adjustable ball cup takes the form of a sliding body which supports the bearing plate and has a spherically shaped surface, and which is supported in a corresponding spherically shaped bearing support.

In both cases the arrangement is such that the adjustable ball cup maintains its position after adjusting. The center point of the ball cup is coaxial to the shaft of the spinning rotor.

In a particularly advantageous embodiment of the present invention, the sliding body is pressed, free from play, against the bearing support supporting the sliding body on one side with an axial force directed against the axial thrust. Hereby it is ensured that the size of the bearing gap cannot change consequently. In addition, the axial force ensures that the bearing plate maintains its adjusted position.

The axial force can be generated in different ways, for example by means of a pressurized chamber. The air in the pressurized chamber can flow out through the bore holes into the bearing gap, while simultaneously pressing the adjustable ball cup against the bearing support.

However, for generating the axial force, a spring element is advantageously used according to certain preferred embodiments of the invention. This can be formed by a rubber ring which presses the sliding body against the bearing support.

In order to adjust the bearing gap, the end of the shaft is pressed tightly against the bearing plate during assembly, when, due to the compressibility of the rubber ring, the bearing plate is aligned exactly to the end of the shaft. After pressing, the bearing gap arises with exact positioning of the two surfaces, due to the fact that the rubber ring springs back.

The present invention has furthermore the advantage that any change in the bearing gap, for example caused by a replacement of the open-end spinning rotor, corrects itself, in that the adjustable ball cup re-aligns itself.

Other objects, advantages and novel features of the present invention will become apparent from the following detailed description of the invention when considered in conjunction with the accompanying drawings.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
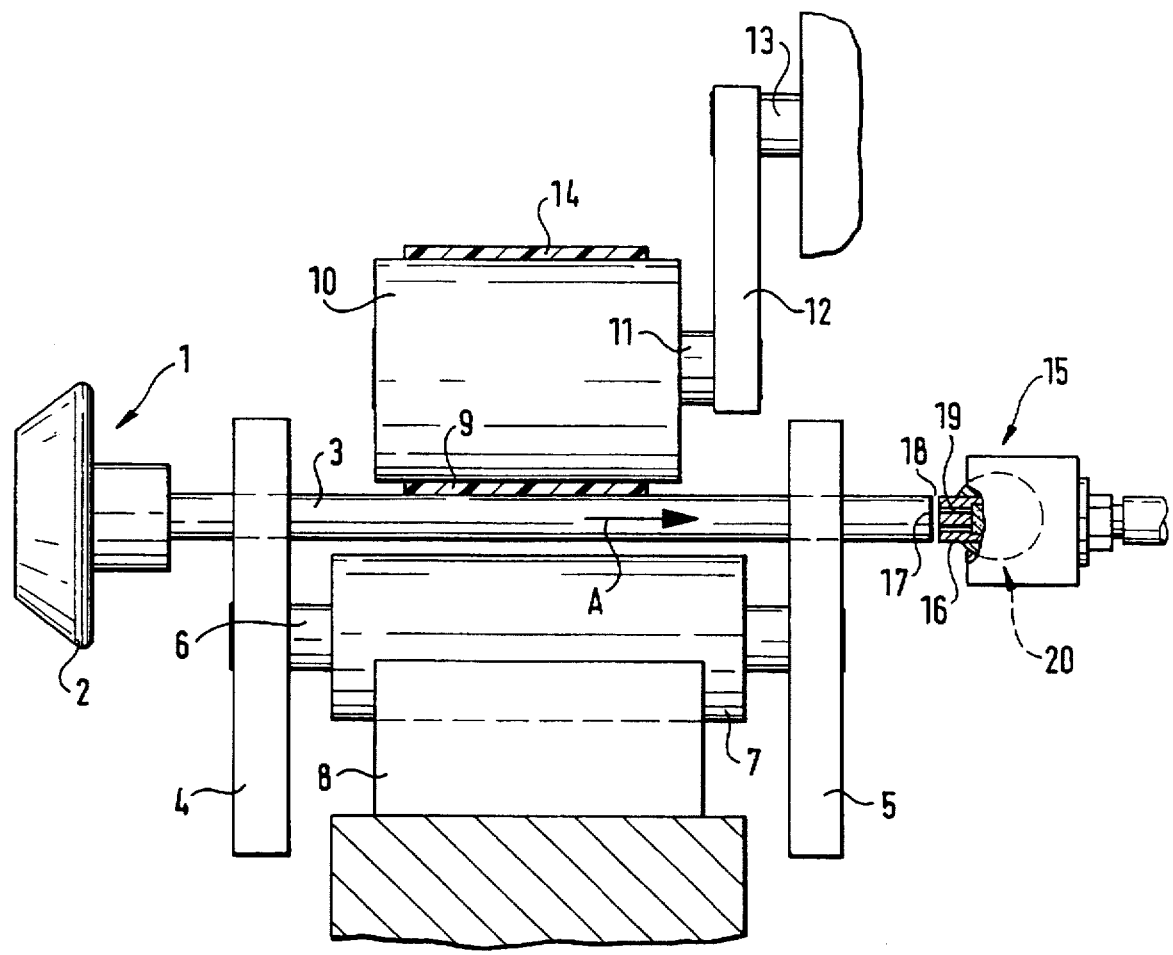
FIG. 1 is a partly sectional side view of a bearing for an open-end spinning rotor.

The open-end spinning rotor 1 shown in FIG. 1 comprises a rotor 2 and a shaft 3 connected thereto in a known way. Two supporting disc pairs 4 and 5 serve the radial bearing of the shaft 3 in a generally known manner. The axles 6 of the supporting disc pairs 4 and 5 are supported in bearing housings 7, which are in turn arranged in a joint bearing support 8 in a known manner.

A continuous tangential belt 9 extending in longitudinal direction of the open-end spinning machine serves to drive all the shafts 3 on one machine side. A tension pulley 10 is arranged at each open-end spinning rotor 1, which pulley 10, due to the force of a spring (not shown), presses the tangential belt 9 onto the respective shaft 3. The individual tension pulleys 10 are each arranged freely rotatable on an axle 11, which in turn is secured on a swivel axle 13 by a swivel lever 12 in a known manner. The tension pulley 10 serves also to guide the reversing end of the tangential belt 9.

By slightly crossing the two axles 6 of the supporting disc pairs 4 and 5 in connection with the direction of the path of the tangential belt 9, an axial thrust A is exerted in a known manner on the shaft 3, which thrust acts against an aerostatic bearing 15. The aerostatic bearing 15 comprises a bearing plate 16, which forms a narrow bearing gap 18 with the end 17 of the shaft 3. The bearing plate 16 is provided with bore holes 19 for the release of air fed to the bearing gap 18.

In order that the open-end spinning rotor 1 operates at an optimum, it is important that the bearing gap 18 is exactly adjusted and that in particular the end 17 of the shaft 3 is aligned exactly parallel to the bearing plate 16. A holder which is adjustable to a center point and which takes the form of a ball cup 20, only denoted in FIG. 1, serves this purpose. The function of preferred embodiments of this holder will be explained in more detail below with the aid of the remaining figures.

Figure 2:
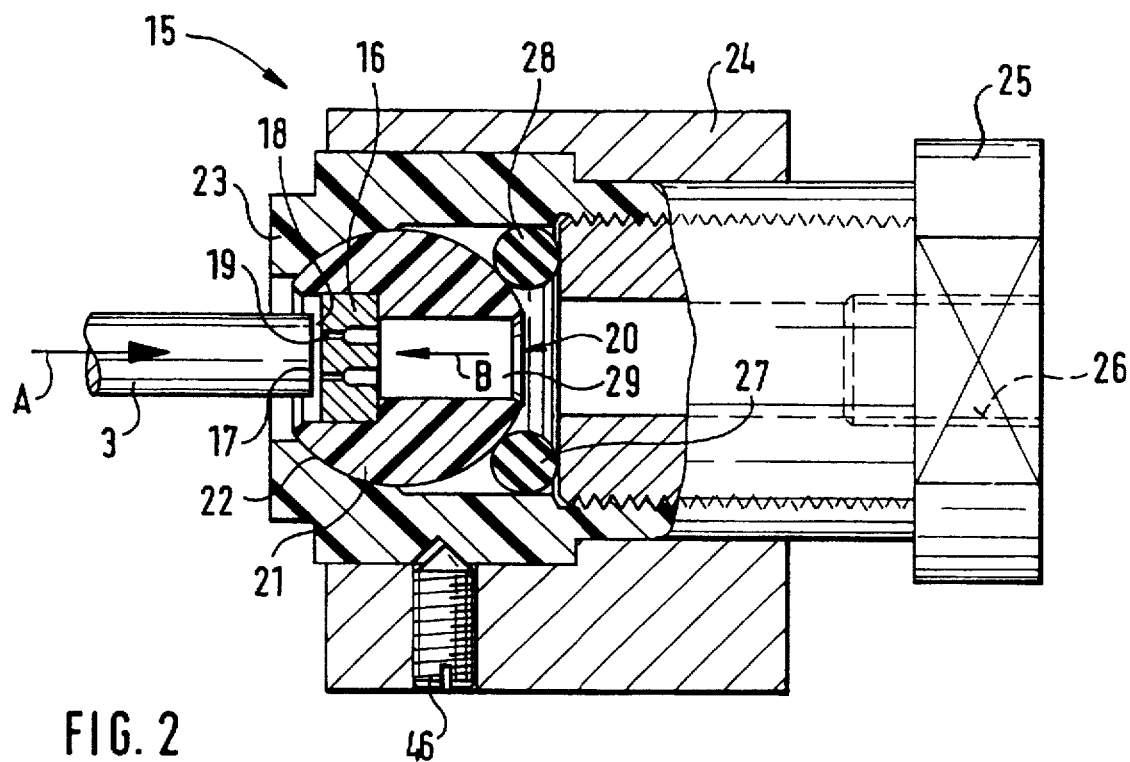
FIG. 2 is a greatly enlarged representation of a first embodiment of an adjustable ball cup of an aerostatic bearing.

A first embodiment for an adjustable ball cup 20 is shown in FIG. 2. This construction is essentially a spherically shaped sliding body 21, made of low friction material plastic. The sliding body 21 is supported free from play in a bearing support 22, which has a corresponding spherically shaped area. The play-free arrangement of the sliding body 21 on the bearing support 22 is effected by an axial force B, which is directed against the above mentioned axial thrust A.

The bearing support 22 is incorporated into a sliding housing 23, which is also made of a low-friction plastic. A metal step bearing housing 24 takes up the sliding housing 23, which is fixed by means of a fixing screw 46.

The sliding body 21 has a recess on the side which faces the shaft 3, which recess graduates into an air channel 29. The bearing plate 16 is set into the recess and is supported axially against a collar. The bearing plate 16 comprises a plurality of bore holes 19, which are connected on the one hand with the air channel 29 and on the other with the bearing gap 18. The bore holes 19 become narrower in the air transport direction.

The step bearing housing 24 is closed by means of a screw 25 on the side facing away from the shaft 3, which screw 25 is provided with an axial bore hole 26. The axial bore hole 26 forms the extension of the air channel 29 and is provided with a compressed air supply (not shown).

There is a small gap between the level ground end of the screw 25 facing the sliding body 21 and the sliding body 21 itself, which is filled by a spring element 27 in the form of a rubber ring 28. The rubber ring 28 is supported on the level end of the screw 25, is further supported on the sliding body 21 and again on an inner bore hole of the sliding housing 23. The rubber ring 28 effects a resilient pressure of the sliding body 21 on the one-sided bearing support 22.

It is important for the aerostatic bearing 15 that the bearing gap 18 is exactly adjusted, in particular that the two level surfaces of the end 17 of the shaft 3 and the bearing plate 16 arranged to face each other are aligned parallel to each other. This happens already during assembly of the respective open-end spinning rotor 1.

For the purpose of adjusting, the end 17 of the shaft 3 is pressed tightly against the bearing plate 16. This pressure acts against the axial load B which is caused by the spring element 27. The rubber ring 28 gives under the pressure, due to its compressibility, so that the end 17 of the shaft 3 aligns the bearing plate 16 parallel to itself: the air pressure is switched off during assembly. The adjustable ball cup 20 in the form of a sliding body 21 tilts very slightly during this process, at angular seconds in the bearing support 22, without being hindered by the rubber ring 28. When the pressure on the shaft 3 is removed, the axial force B caused by the spring element 27 presses the sliding body 21 back against its bearing support 22, without changing the position of the bearing plate 16. The bearing plate 16 remains aligned exactly parallel to the end 17 of the shaft 3, that is, the corresponding bearing surfaces which form the bearing gap 18 are adjusted exactly to one another.

Even if the adjusting ball cup 20 is not adjusted during assembly, or after an open-end spinning rotor 1 has been replaced, the sliding body 21 can align itself. A replacement of the open-end spinning rotor 1 comes into consideration for example when the supporting disc pairs 4 and 5 have to be exchanged due to wear. The bearing gap 18 adjusts itself, and is thus not dependent on operating personnel.

In the embodiments to be described below, the same reference numbers are used as those up to now insofar as an identical component, or at least one with the same function is concerned. The descriptions will therefore not be repeated.

Figure 3:
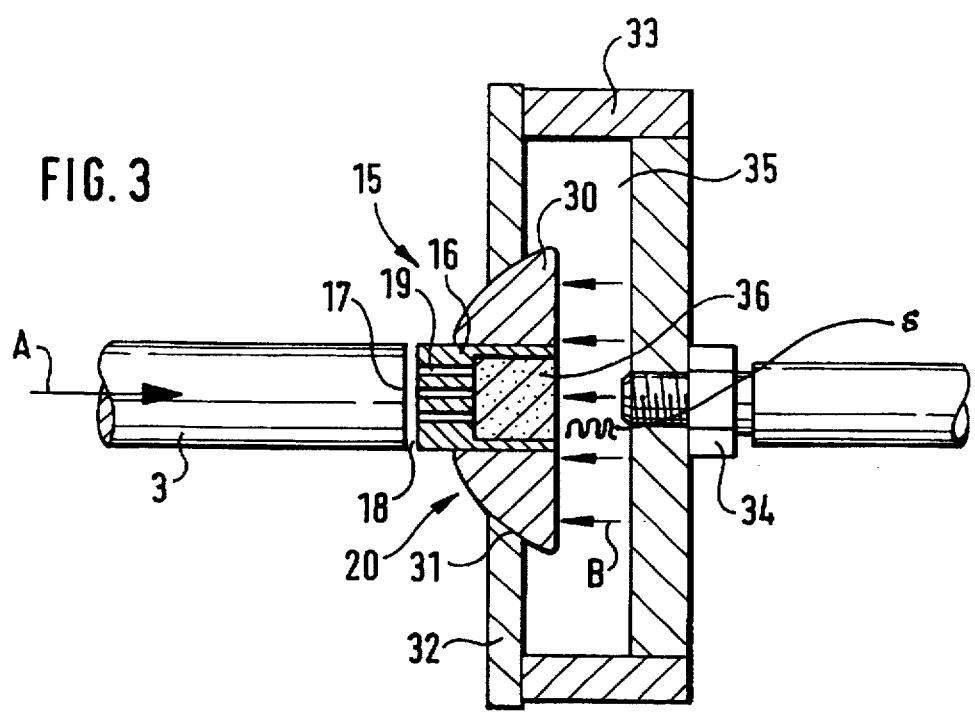
FIG. 3 is a view similar to FIG. 2 showing another preferred embodiment of an adjustable ball cup of an aerostatic bearing.

In the embodiment according to FIG. 3, a sliding body 30 is provided, which consists simply of a spherical segment, in the case of which the spherical surface is pressed against a correspondingly formed bearing support 31. The pressure is effected, also free from play, under the influence of an axial force B, which is directed against the axial thrust A. The sliding body 30, as well as the lid 32 comprising the bearing support 31, are made of plastic.

The sliding body 30 comprises an axial through bore hole into which the bearing plate 16 is pushed. On the side facing away from the end 17 of the shaft 3, an insert 36 made of sinter metal is arranged at the inlet of the bore holes 19 located in the bearing plate 16. This insert 36 acts as a choke point for the subsequent bore holes 19.

The lid 32 serves to close a step bearing housing 33, which is connected to a compressed air supply 34. The step bearing housing 33 surrounds a pressurized chamber 35, from which the bearing air flows into the gap 18, and which chamber 35 is also responsible for the axial force B which presses the sliding body 30 against its one-sided bearing support 31. The adjusting of the bearing gap 18, that is the parallel aligning of the bearing plate 16 to the end 17 of the shaft 3 takes place here while the shaft 3 is at a standstill and the compressed air is switched on, so that the axial force B is always present.

Adjusting takes place as in the embodiment described above, whereby the bearing plate 16 and the end 17 of the shaft 3 mutually align themselves.

To this purpose, the axial force B is supported by an additional schematically shown spring element 5 that in particular comes into force when the compressed air is switched off while the machine is at a standstill.

Figure 4:
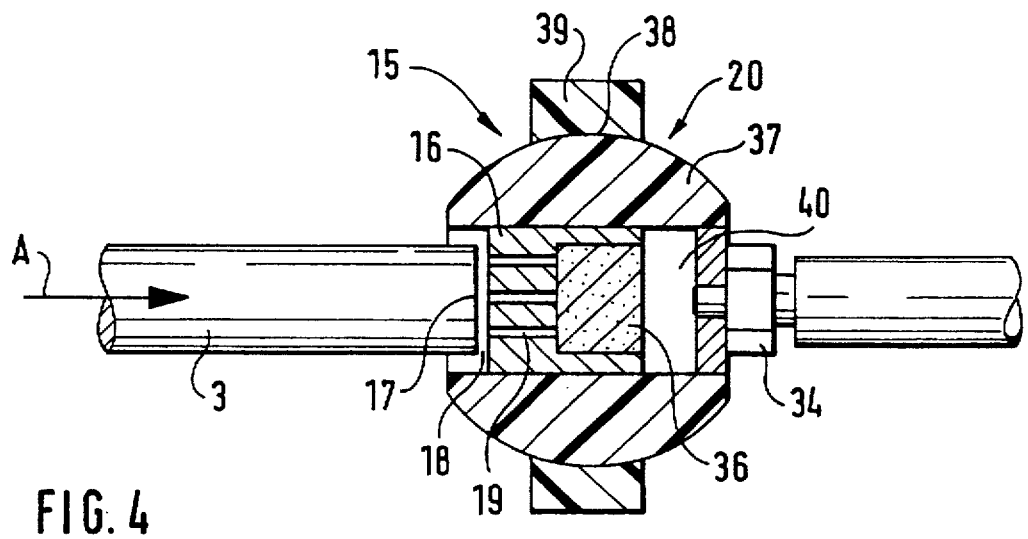
FIG. 4 is a view similar to FIG. 2 showing another preferred embodiment of an adjustable ball cup of an aerostatic bearing.

In the case of the embodiment according to FIG. 4, again a spherically shaped sliding body 37 is provided, which is made from a low-friction plastic and which is supported by a sliding housing 39, whose bearing support 38 is also almost of low friction material. A plastic coating might be sufficient for this purpose. As the pressure against the bearing support 38 is not effected by an axial force directed against the axial thrust A, the fit between the sliding body 37 and the bearing support 38 has to be very precisely made. To this end, the sliding housing 39 is made of two parts, so that the bearing support 38 is pressed against the sliding body 37 from two opposite sides. This pressing should be so minimal that the bearing plate 16 and the end 17 of the shaft 3 can align themselves exactly parallel to one another.

Between the compressed air supply 34 and the insert 36 of sinter metal also provided here, there is a pressurized chamber 40, so that the bearing air enters the bore holes 19 uniformly.

Figure 5:
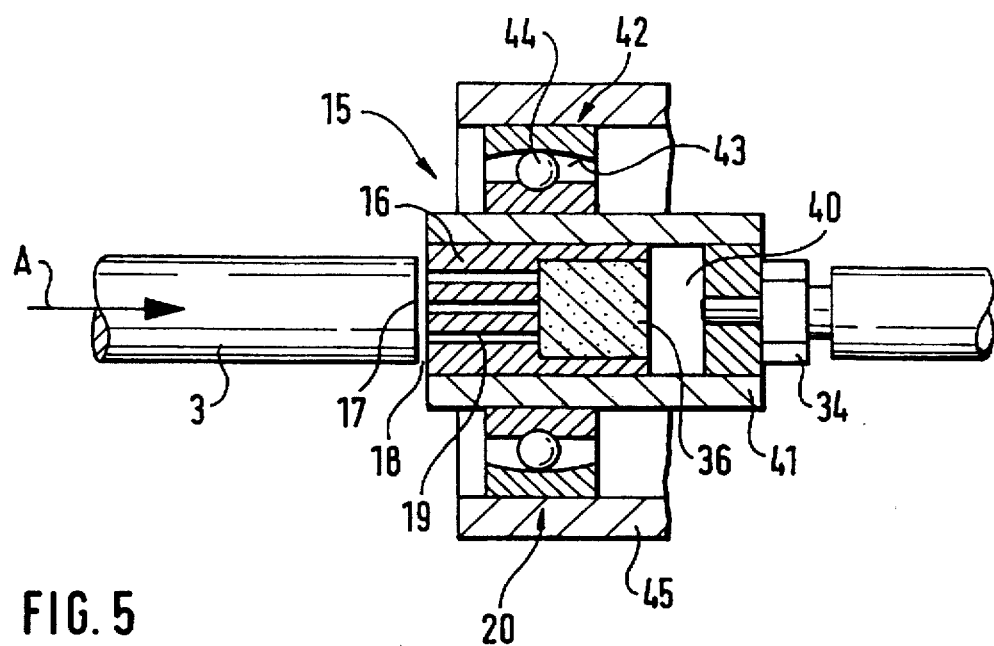
FIG. 5 is a view similar to FIG. 2 showing another preferred embodiment of an adjustable ball cup of an aerostatic bearing.

In the embodiment according to FIG. 5 the adjusting ball cup 20 takes the form of a self-aligning bearing 42, which supports a mounting 41 of the bearing plate 16. The outer ring of the self-aligning bearing 42 has a spherical surface 43, on which roller bearing balls 44 are guided. The outer ring is supported in a step bearing housing 45.

In this case, the end 17 of the shaft 3 also aligns itself parallel to the bearing plate 16.

In order that the adjusting of the bearing gap 18 is not hindered by the tilting of an adjusting ball cup 20, the compressed air supplies 34 in all embodiments are connected to very flexible tubes.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A thrust bearing arrangement for supporting an end of a shaft of an open end spinning rotor against axial thrust forces, comprising:

a bearing plate configured to be axially spaced from the end of the shaft by a bearing gap supplied with pressurized air and arranged in a face-to-face relationship with the end of the shaft, and a holder configured to hold the bearing plate and permit adjusting movements of the bearing plate with respect to the end of the shaft, said holder including:

a first part movable with the bearing plate and having a first spherical surface, and a second part with a second spherical surface mating with the first spherical surface, said mating spherical surfaces controlling movement of the first part with respect to the second part around a center point of said spherical surfaces.

2. A thrust bearing arrangement according to claim 1, wherein the bearing plate is provided with bore holes for the release of air into the bearing gap.

3. A thrust bearing arrangement according to claim 2, wherein the holder includes a ball cup comprising the first and second parts.

4. A thrust bearing arrangement according to claim 2, wherein the center point of the spherical surfaces is coaxial to the shaft when in an in use position supporting the shaft.

5. A thrust bearing arrangement according to claim 4, wherein the first and second parts form a self-aligning bearing supporting a mounting carrying the bearing plate.

6. A thrust bearing arrangement according to claim 4, wherein the a first part is a sliding body which supports the bearing plate, which sliding body is supported in a corresponding spherically shaped bearing support including said second part.

7. A thrust bearing arrangement according to claim 6, comprising axial force applying means for applying axial force on the sliding body in a direction opposite axial thrust forces from the end of the rotor shaft during use of the thrust bearing arrangement.

8. A thrust bearing arrangement according to claim 1, wherein the holder includes a ball cup comprising the first and second parts.

9. A thrust bearing arrangement according to claim 1, wherein the center point of the spherical surfaces is coaxial to the shaft when in an in use position supporting the shaft.

10. A thrust bearing arrangement according to claim 9, wherein the first part is a sliding body which supports the bearing plate, which sliding body is supported in a corresponding spherically shaped bearing support including said second part.

11. A thrust bearing arrangement according to claim 10, wherein the sliding body is pressed, free from play, against the bearing support which supports the sliding body on one side, by an axial force directed against the axial thrust.

12. A thrust bearing arrangement according to claim 11, wherein a pressurized chamber is operatively associated with the holder for generating the axial force.

13. A thrust bearing arrangement according to claim 11, wherein a spring element is operatively associated with the holder for generating the axial force.

14. A thrust bearing arrangement according to claim 13, wherein the spring element is a rubber ring.

15. A thrust bearing arrangement according to claim 10, comprising axial force applying means for applying axial force on the sliding body in a direction opposite axial thrust bearing arrangement.

16. A thrust bearing arrangement according to claim 1, wherein the first and second parts form a self-aligning bearing supporting a mounting carrying the bearing plate.

17. A thrust bearing arrangement according to claim 16, wherein the bearing plate is provided with bore holes for the release of air into the bearing gap.

18. A thrust bearing arrangement according to claim 1, wherein the first part is a sliding body which supports the bearing plate, which sliding body is supported in a corresponding spherically shaped bearing support including said second part.

19. A thrust bearing arrangement according to claim 18, wherein the sliding body is pressed, free from play, against the bearing support which supports the sliding body on one side, by an axial force directed against the axial thrust.

20. A thrust bearing arrangement according to claim 19, wherein a pressurized chamber is provided for generating the axial force.

21. A thrust bearing arrangement according to claim 19, wherein a spring element is associated with the holder for generating the axial force.

22. A thrust bearing arrangement according to claim 21, wherein the spring element is a rubber ring operatively associated with the holder.

23. A thrust bearing arrangement according to claim 18, comprising axial force applying means for applying axial force on the sliding body in a direction opposite axial thrust forces from the end of the rotor shaft during use of the thrust bearing arrangement.

* * * * *